(12) United States Patent
Zhou et al.

(10) Patent No.: US 8,699,574 B2
(45) Date of Patent: *Apr. 15, 2014

(54) SYSTEM AND METHOD FOR BOUNDARY MOTION VECTOR CORRECTION IN MOTION COMPENSATED FRAME RATE

(75) Inventors: Zhi Zhou, Irvine, CA (US); Yeong-Taeg Kim, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 333 days.

This patent is subject to a terminal disclaimer.

(21) Appl. No.: 13/284,844

(22) Filed: Oct. 28, 2011

(65) Prior Publication Data

US 2012/0044997 A1 Feb. 23, 2012

Related U.S. Application Data

(63) Continuation of application No. 11/767,365, filed on Jun. 22, 2007, now Pat. No. 8,050,325.

(51) Int. Cl.
*H04N 7/12* (2006.01)
*G06K 9/36* (2006.01)
*H04N 11/02* (2006.01)

(52) U.S. Cl.
USPC ............ 375/240.16; 375/240.12; 375/240.13; 375/240.14; 375/240.15; 382/232; 382/233; 382/234; 382/235; 382/236

(58) Field of Classification Search
USPC ..................................... 375/240.16
See application file for complete search history.

(56) References Cited

U.S. PATENT DOCUMENTS

| 6,393,054 B1 * | 5/2002 | Altunbasak et al. | ........... 375/240 |
| 7,667,778 B2 * | 2/2010 | Yoshiwara | ..................... 348/699 |
| 2008/0285656 A1 * | 11/2008 | Au et al. | .................. 375/240.22 |

* cited by examiner

*Primary Examiner* — Longbit Chai
(74) *Attorney, Agent, or Firm* — IP Investment Law Group

(57) ABSTRACT

A method of processing video data includes: receiving a first video frame with first blocks of pixels associated with a known motion vector and a second video frame with second blocks of pixels, the second blocks corresponding to the first blocks, and uncovered blocks adjacent to the first frame boundary not corresponding to the first blocks in the first video frame; determining a first block for each line segment in the second video frame corresponding to a block in the first video frame, wherein the first block has the known motion vector from the first video frame; and assigning a motion vector for at least one of the line segments in the second video frame to the uncovered blocks in the line segment of the second video frame between first block and the first frame boundary.

26 Claims, 8 Drawing Sheets

SYSTEM AND METHOD FOR BOUNDARY MOTION VECTOR CORRECTION IN MOTION COMPENSATED FRAME RATE

CROSS-REFERENCE TO RELATED APPLICATION(S)

This is a continuation of co-pending U.S. patent application Ser. No. 11/767,365 filed Jun. 22, 2007.

BACKGROUND OF THE INVENTION

1. Field of the Invention

The invention is related to video processing. More particularly, the invention is related to assigning more reliable motion vectors for blocks of video data adjacent the frame boundary.

2. Description of the Related Art

Multimedia processing systems, such as video encoders, may encode multimedia data using encoding methods based on international standards such as MPEG-x and H.26x standards. Such encoding methods generally are directed to compressing the multimedia data for transmission and/or storage. Compression is broadly the process of removing redundancy from the data. In addition, video display systems may transcode or transform multimedia data for various purposes such as, for example, to ensure compatibility with display standards such as NTSC, HDTV, or PAL, to increase frame rate in order to reduce perceived motion blur, and to achieve smooth motion portrayal of content with a frame rate that differs from that of the display device. These transcoding methods may perform similar functions as the encoding methods for performing frame rate conversion, de-interlacing, etc.

A video signal may be described in terms of a sequence of pictures, which include frames (an entire picture), or fields (e.g., an interlaced video stream comprises fields of alternating odd or even lines of a picture). A frame may be generally used to refer to a picture, a frame or a field. Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. Depending on context, a block may refer to either a macroblock or a subblock, or even a single pixel.

Video sequences may be received by a receiving device in a compressed format and subsequently decompressed by a decoder in the receiving device. Video sequences may also be received in an uncompressed state. In either case, the video sequence is characterized at least by a frame rate, and a horizontal and vertical pixel resolution. Many times, a display device associated with the receiving device may require a different frame rate and/or pixel resolution and video reconstruction of one or more video frames may be performed. Reconstruction of video frames may comprise estimating a video frame between two or more already received (or received and decompressed) video frames. The reconstruction may involve techniques known as motion estimation and motion compensation. Matching portions of video frames between two or more already received (or received and decompressed) frames are identified along with a motion vector that contains the relative locations of the matching blocks in the process of motion estimation. These matching blocks and motion vectors are then used to reconstruct portions of the intermediate frame by the process of motion compensation. Frame rate conversion, de-interlacing and transcoding are examples of processes where decoder devices create new video data based on already reconstructed video data. In addition, these motion compensation techniques can use encoded data, such as motion vectors and residual error, as well as the reconstructed video data for estimating the newly created frames.

In some circumstances, motion estimation can be complicated. For example, when the image as a whole is moving or panning either horizontally or vertically, the area adjacent the boundary area in a new frame may be an uncovering area. Some of the blocks in the uncovering area will be new blocks in the current frame and will not have matching content in a previous frame.

In one implementation, the blocks in the uncovering area are matched to blocks in the previous frame that have a similar intensity value as determined by a sum of the absolute difference determination. However, the blocks in the previous frame that have a similar intensity value may not have any correspondence to the blocks in the uncovering area. Consequently, assigning motion vectors to the blocks in the uncovering area based upon a search for blocks in the previous frame that have similar intensity values may result in motion vectors being assigned to the blocks in the current frame in the uncovering area that are unreliable. Hence, motion vectors for these blocks in the current frame based upon this method are unreliable and are often not corrected thereby degrading image quality.

In these circumstances, a forward motion estimation can be used to find matching content in a subsequent frame and determine the motion vector for these uncovering blocks in the present frame based upon the relative position of these blocks in the present frame and the subsequent frame. The problem with forward motion estimation is that it requires that the current frame be delayed while the subsequent frame is accessed and then subsequent motion estimation is done on the subsequent frame. This results in a more complicated system which imposes costs in terms of both processing time and potentially hardware. This cost can be burdensome for performing this type of motion estimation on blocks that are adjacent the frame boundary and, as such, is generally not done. Due to the complexity and expense of forward motion estimation, many systems simply attempt to match blocks in the uncovering area to the best intensity based match in a previous frame and assign the motion vector accordingly. As such, many of the blocks in uncovering areas adjacent a frame edge have motion vectors which are not accurate or reliable and thereby degrade image quality.

Based on the foregoing, it will be appreciated that there is a need for an improved method or system capable of determining motion vectors of blocks of video data located adjacent the frame boundary. To this end, there is a need for a motion estimation technique that can be used on selected video data located adjacent a frame boundary, such as the left or right vertical boundaries or the top or bottom horizontal boundaries, in uncovering areas.

SUMMARY OF CERTAIN INVENTIVE ASPECTS

The systems and method of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled Detailed Description of Certain Inventive Embodiments one will understand how the sample features of this invention provide advantages that include more robust and efficient motion vector assignment to uncovering blocks adjacent frame boundaries.

In one aspect the aforementioned needs are satisfied by an implementation that comprises a method of processing video data including: receiving a first video frame with first blocks of pixels associated with a known motion vector and a second video frame with second blocks of pixels and having motion in the direction of a first frame boundary, the second blocks corresponding to the first blocks, and uncovered blocks adjacent to the first frame boundary not corresponding to the first blocks in the first video frame; determining a first block for each line segment in the second video frame corresponding to a block in the first video frame, wherein the first block is in the second frame located proximate to the first frame boundary and has the known motion vector from the first video frame; and assigning a motion vector for at least one of the line segments in the second video frame to the uncovered blocks in the line segment of the second video frame between first block and the first frame boundary.

In another aspect, the aforementioned needs are satisfied by an implementation that comprises a method of processing a sequence of video frames including: receiving a video frame N−1 having first blocks of video data with motion vectors assigned thereto; receiving a video frame N having second blocks of the video data; determining whether the video frame N has motion in the direction of a first frame boundary where the second blocks correspond to the first blocks and uncovered blocks adjacent to the first frame boundary in the video frame N not corresponding to the first blocks in the video frame N−1; determining a first block for one or more line segments n of the video frame N corresponding both to a block in the video frame N−1 and positioned proximate to the first frame boundary for which a known motion vector is known in the video frame N−1, for the video frames N having motion in the direction of the first frame boundary and the second blocks in the video frame N corresponding to the plurality of blocks in the video frame N−1 and the uncovered blocks adjacent to the first frame boundary in the video frame N not corresponding to blocks in the video frame N−1; determining a motion vector for one or more of the line segments n in the video frame N for one or more blocks of video data j interposed between the first block and the first frame boundary; formatting the image of the video frame N for subsequent display thereof; and incrementing N and repeating the steps above for subsequent frames in the sequence of the video frames.

In yet another implementation the aforementioned needs are satisfied by a system for processing video data including: a receiver for receiving a first frame and a second frame of sequential video data, the first frame including a first blocks of pixels with a known motion vector associated therewith and the second frame having relative motion with respect to the first frame with a second blocks in the second frame corresponding to the first blocks in the first frame, and uncovered blocks adjacent to a first frame boundary not corresponding to the first blocks; and a motion estimation system for determining a first block of each line segment of the second frame corresponding to block in the first frame having the known reliable motion vector, for determining when the first block is within a threshold distance of the first frame boundary, and for assigning a motion vector to the remaining blocks interposed between the first block and the first frame boundary having unknown motion vectors.

DETAILED DESCRIPTION OF CERTAIN INVENTIVE EMBODIMENTS

The following detailed description is directed to certain specific sample aspects of the invention. However, the invention can be embodied in a multitude of different ways as defined and covered by the claims. In this description, reference is made to the drawings wherein like parts are designated with like numerals throughout.

Video signals may be characterized in terms of a series of pictures, frames, or fields. As used herein, "frame" is a term that may encompass either frames or fields of a progressive video signal or frames or fields of an interlaced video signal.

Covering portions of video include objects in a first frame that are covered by an object (e.g., an object in the foreground of the covering object) in a subsequent frame. Uncovering portions of video include objects that are not in a first frame and appear (due to being uncovered by an object in the foreground or by the uncovering object itself moving from behind a foreground object) in a subsequent frame. Uncovering areas can also include areas of a frame that are adjacent a frame boundary, either a left or right vertical boundary or a top or bottom horizontal boundary, that are blocks of video data that did not occur in a previous frame. This type of uncovering can result from a number of sources including motion of the overall image, such as the motion that occurs when the camera is panning in a direction of one of the frame boundaries. The frame can also include normal portions of video which include portions that are neither covering nor uncovering.

Embodiments of processing video data including classifying portions of video as either covering, uncovering or normal will be described. The processing can be performed in a video decoder, a video transcoder or a video display system. Embodiments using motion vectors of multiple matching blocks of video data from a first frame to a second frame to classify and reconstruct blocks of video data in a frame between the first and second frames will be described. Methods of determining video data closest to a frame boundary that has a reliable motion vector from a previous frame will be disclosed. Further, methods and systems that make such a determination and then assign motion vectors to the blocks in this uncovering area adjacent a frame boundary which would have unreliable motion vectors assigned in a backward motion estimation system will also be disclosed.

Figure 1:
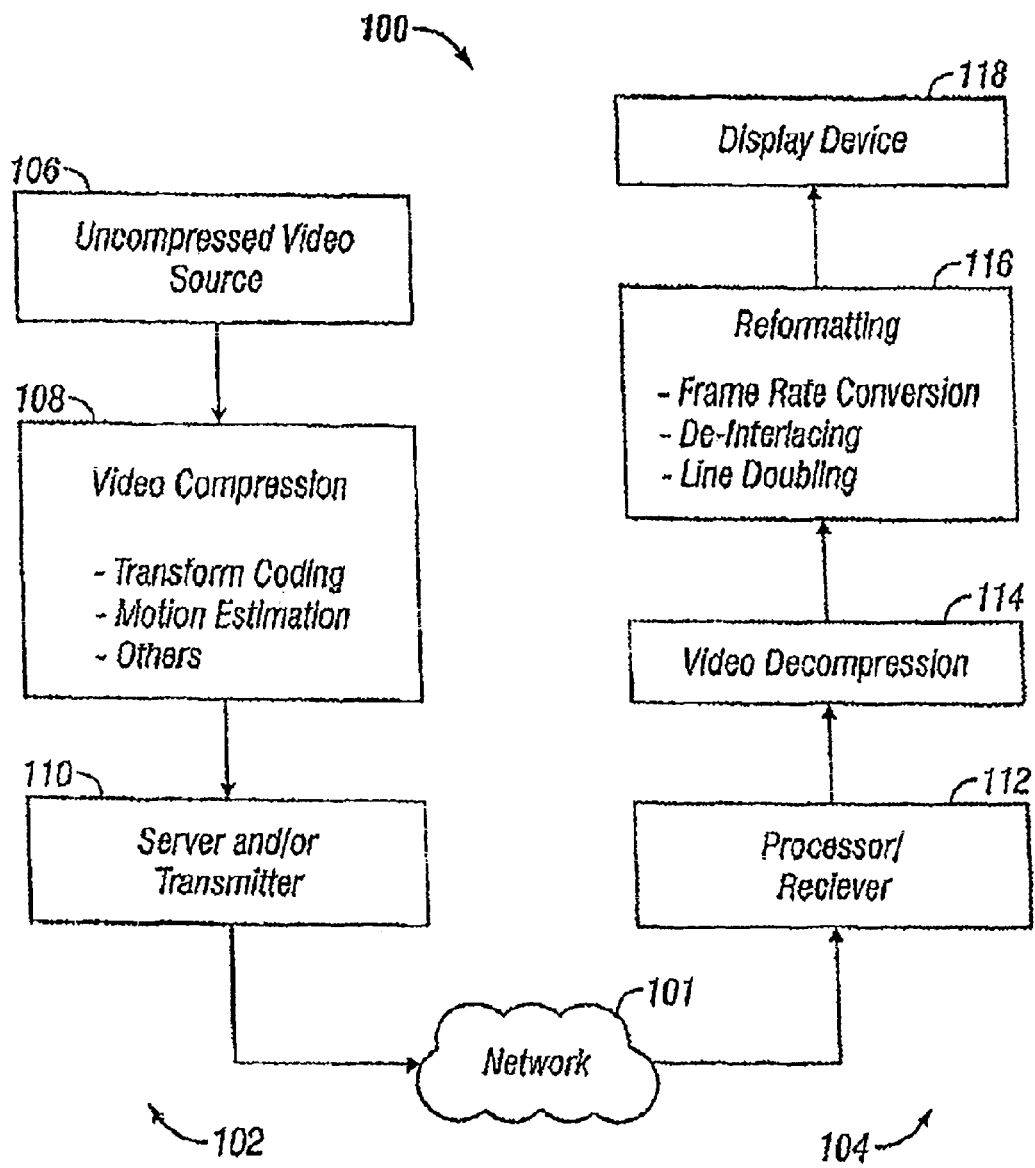
FIG. 1 is a functional block diagram of an exemplary video system for encoding and decoding of compressed digital video data, according to one embodiment of the system and method.

FIG. 1 illustrates a functional block diagram of an exemplary video system 100. The system 100 includes a video source 102 and video reception device 104. In this embodiment, the video source 102 obtains raw (uncompressed) video from an uncompressed video source 106, compresses it with a video compression element 108 and stores or communicates the compressed video data using a communication element 110. The video reception device 104 includes a processor and/or receiver 112, a video decompression element 114 and a reformatting subsystem 116. The compressed video can be communicated from the video source 102 to the video reception device 104 via a network 101.

The uncompressed video source 106 can be a video camera, or a memory device such as a disk drive. The uncompressed video source 106 provides uncompressed video data in the form of luminance and chrominance, or in individual color intensities such as red, green and blue, etc.

The video compression element 108 performs any of various video encoding techniques to remove the redundancy from the uncompressed video data. Transform coding may be used to remove higher spatial frequency components thereby removing spatial redundancy within a frame. Most video compression schemes involve a form of motion estimation such as block matching/motion compensated prediction or optical flow as well as others. The purpose of the motion estimation schemes is to remove the temporal redundancy between frames in a video sequence. Other forms of video compression known to skilled technologists may also be used in the video compression element 108.

The communication element 110 may be a server that is connected to the Internet and stores the compressed video. The communication element 110 may also be a transmitter that is configured to transmit the compressed video over the network 101. The network 101 may comprise one or more of a wireline or wireless communication system, including one or more of a Ethernet, telephone (e.g., POTS), cable, powerline, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1×EV-DO or 1×EV-DO Gold Multicast) system, an IEEE 802.11 system, a DMB (Digital Multimedia Broadcasting) system, an orthogonal frequency division multiple access (OFDM) system, or a DVB-H (Digital Video Broadcasting-Handheld) system.

The processor/receiver 112 of the video reception device 104 receives the compressed video over the network 101. In another embodiment, the processor/receiver accesses the compressed video from a memory storage device such as a DVD, a hard drive, a memory card, etc. The processor/receiver 112 can be included in a personal computer, a set top box, a handheld device, etc.

The video decompression element 114 decodes (e.g., decompresses) the received compressed video data. The video decompression element 114 reconstructs the video frames that were compressed in the encoding process. Reconstruction can include inverse transformation of transformed coefficients (e.g., discrete cosine transform (DCT), wavelet transform, etc.), reconstruction of spatially predicted data, and reconstruction of temporally predicted data. The video decompression element 114 can be part of the same device that contains the processor/receiver 112, or it can be a separate device. The video reception device 104 can be part of a set-top box, a DVD player, a PC, etc. In some embodiments, the video reception device 104 may receive uncompressed video (e.g., from the uncompressed video source 106). In these embodiments, the video decompression element 114 may be omitted.

The format of the reconstructed video output from the video decompression element 114 depends on the format that was encoded by the video encoder. For example, digital video formats can include different frame rates, different numbers of lines and rows of pixels, interlaced and non-interlaced, etc. For example, movies are typically produced at 24 fps (frames per second) format, NTSC is 30 frames per second and PAL is 25 frames per second. The format may be interlaced or progressive. The reformatting subsystem 116 modifies the video signal to a format that fits the format of a display device 118 that is connected to the video reception device 104. The display device may be a television set (e.g., NTSC, PAL or HDTV), or a computer monitor running at frame rates such as 70 Hz, 75 Hz, 80 Hz, etc. The reformatting subsystem 116 may be part of the same device as the video decompression element 114 and/or the processor receiver 112. In some embodiments as discussed above, the video received by the video reception device 104 may be uncompressed video (e.g., from the uncompressed video source 106) and the video decompression element 114 is omitted. In these embodiments, the reformatting subsystem 116 reformats the uncompressed video.

The processes performed by the reformatting subsystem 116 can be very similar to the encoding schemes used to encode the compressed video data. Motion estimation/compensation can be used to create intermediate frames between reconstructed frames in order to enable frame rate conversion. Therefore, methods of spatial prediction and temporal prediction used in encoder devices can also be used in decoder devices for purposes of reformatting the video. The reformatting subsystem 116 can use reconstructed video data and/or compressed video data (e.g., motion vectors, residual error values, etc.) for performing the reformatting. It will be appreciated from the following discussion that the determination of blocks of video data having reliable motion vectors in a current frame from a previous frame and the subsequent assignment of the same motion vector to the blocks of video data in the current frame which are in the uncovering area adjacent the frame boundary can be performed by the reformatting system 116. However, a person of ordinary skill in the art will appreciate that other functional components within the system 100, including the processor/receiver 112 can be adapted to also perform this function without departing from the scope of the present invention.

Figure 2:
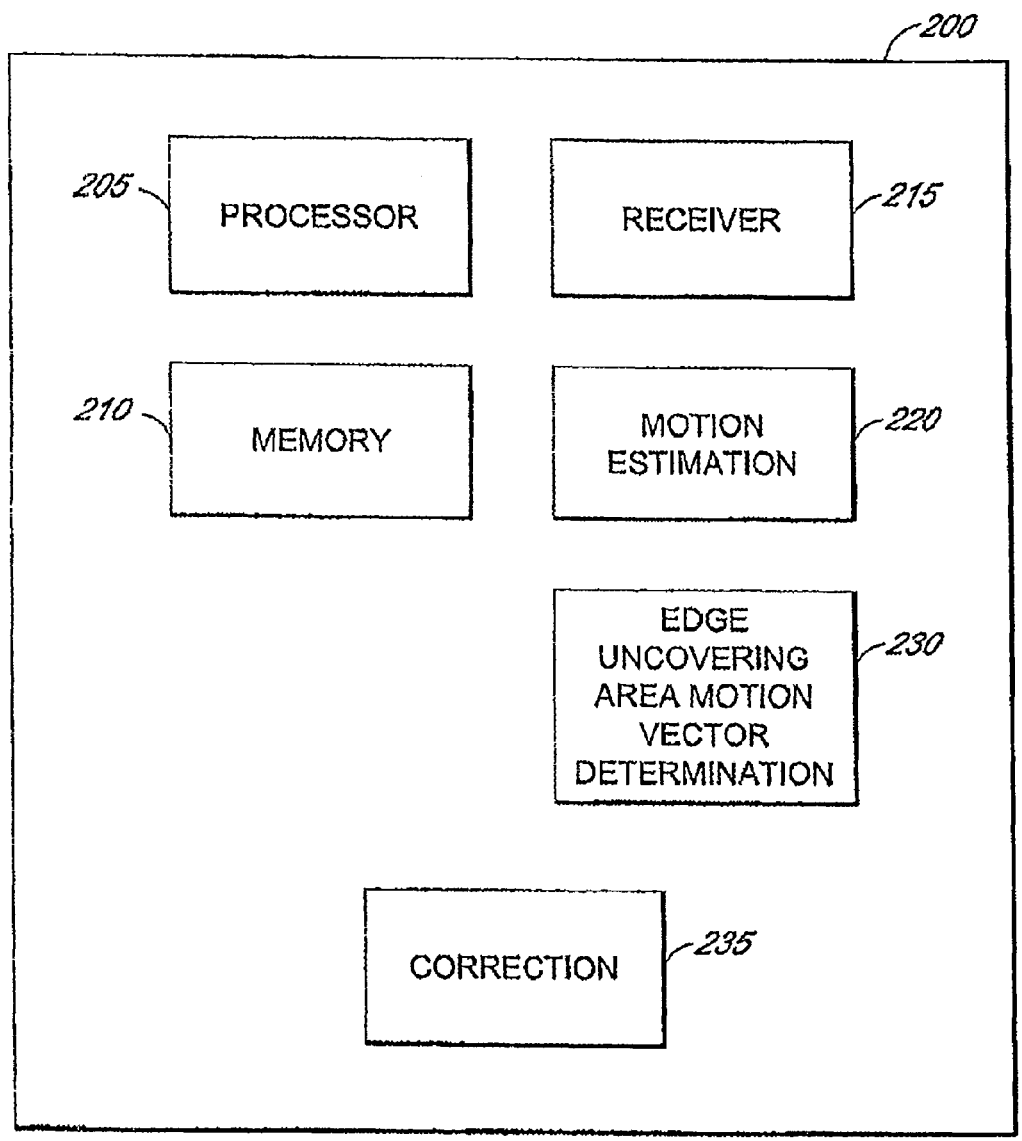
FIG. 2 is a block diagram illustrating an embodiment of a video reception system that may be used for the video reception device in a video system such as illustrated in FIG. 1.

FIG. 2 is a block diagram illustrating an embodiment of a video reception system 200 that may be used for the video reception device 104 in a communication system such as illustrated in FIG. 1. As discussed above, the video reception system 200 can be part of the frame rate conversion function of the reformatting system 116 that is receiving decompressed video from the video decompression subsystem 114 or it can be part of a different subsystem, such as the processor/receiver 112 that is receiving uncompressed video data. The functionally illustrated system in FIGS. 1 and 2 are thus simply illustrative and should not be limiting on the implementation of the system and methods disclosed herein.

In this embodiment, the video reception system 200 comprises a processor element 205, a memory element 210, a receiver element 215, a motion field subsystem 220, an edge uncovering area motion vector determination subsystem 230, and a correction subsystem 235. The processor 205 may include one or more of a general purpose processor and/or a digital signal processor and/or an application specific hardware processor. The memory 210 may include, for example, one or more of integrated circuits or disk based storage or any readable and writeable random access memory device. The processor 205 is coupled to the memory 210 and the other elements to perform the various actions of the other elements. The receiver 215 receives video data over the network 101. In other embodiments, the receiver 215 may be omitted and the video data may be retrieved from the memory element 210 or one or more external memory devices including memory discs, memory cards, internet server memory, etc. The video data received over the network 101 or retrieved from the memory element 210 or from external memory devices may be compressed or uncompressed video data. In the case of compressed video data stored in the memory element 210 or in the external memory devices, the compressed video data may have been created at an earlier time by an encoding device such as the video source 102 in FIG. 1.

The motion estimation subsystem 220 identifies motion vectors of blocks of data. The motion estimation refers to a determination of a motion vector of the blocks in the current frame with the end product being the motion field for the frame. The motion field thus provides overall motion information about the image in the current frame. Motion vectors are determined, in the current frame, by locating a portion of an already reconstructed reference frame that is used to construct the portion of the current frame. In one aspect, a matching block of pixels in a previous frame is identified for each block in the current frame. A residual error measurement, such as the sum of absolute differences (SAD) or a mean square error (MSE) may be used to identify a matching reference portion or portions in a previous frame that may be used to determine a motion vector for a block of data in the current frame.

As discussed above, however, some of the motion vectors assigned to blocks of video data in an uncovering area adjacent a frame boundary using this process may be unreliable. This is the result of the block of data in the current frame that is matched using the residual error measurement technique discussed above to a block of data in the previous frame that is not actually a corresponding block of video data in the previous frame.

As will be discussed below, the edge uncovering area motion vector determination subsystem 230 determines the transition between blocks that have a reliable motion vector known from a previous frame and new blocks of data in the present frame in an uncovering area adjacent a frame edge that have an unreliable motion vector as a result of there being no corresponding block of data in the previous frame. The correction subsystem 235 then assigns a new motion vector to the blocks with unreliable motion vectors in the uncovering area adjacent the frame boundary when certain conditions are met. In this way, motion vector values can be assigned to selected blocks within certain uncovering areas adjacent the frame edge based upon data that had previously been determined in a previous frame.

In some embodiments, one or more of the elements of the video reception system 200 of FIG. 2 may be rearranged and/or combined. The elements may be implemented by hardware, software, firmware, middleware, microcode or any combination thereof. The elements illustrated in FIG. 2 can thus be either specific hardware/software/firmware implementations or can be simply functional illustration of the various functional procedures implemented by the system 200. Details of the actions performed by the elements of the video reception system 200 will be discussed in reference to the processes illustrated in FIGS. 3-6 below.

Figure 3:
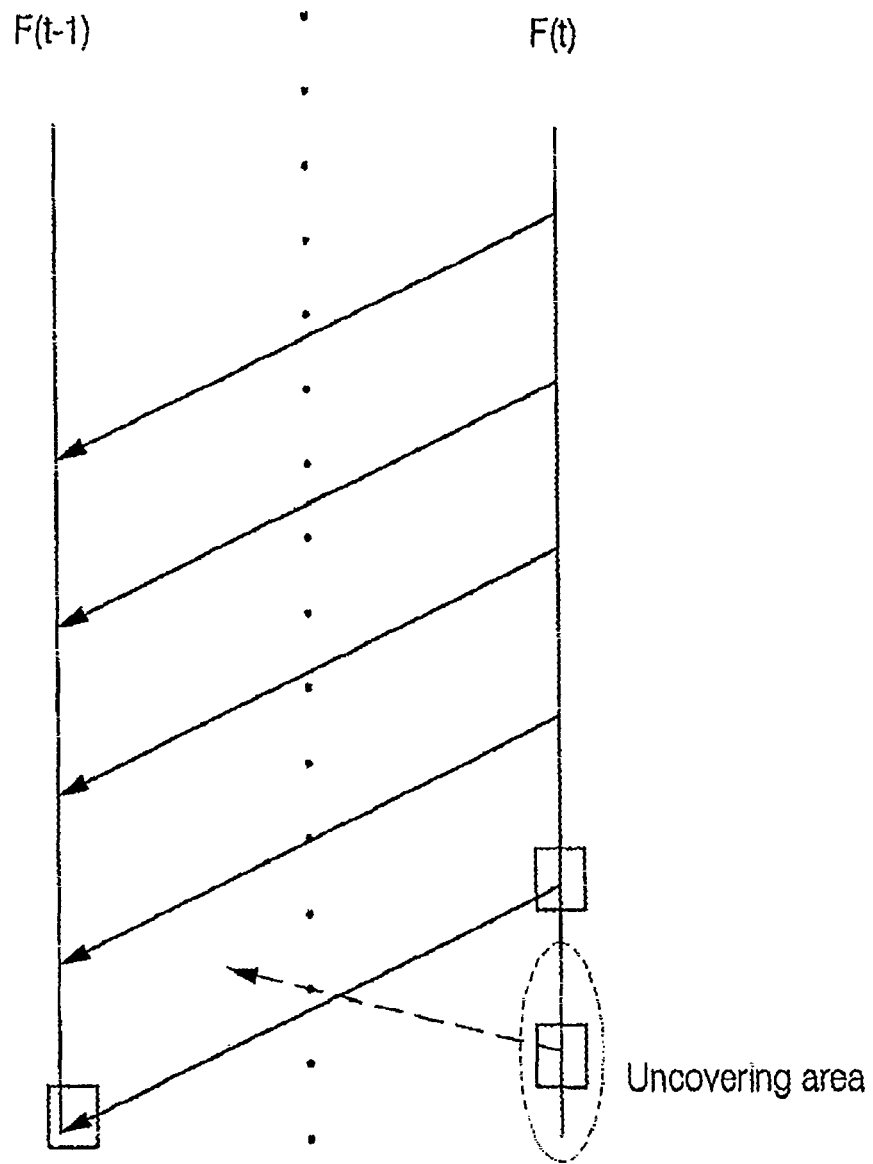
FIG. 3 is a schematic illustration illustrating an uncovering of new blocks of data adjacent a frame boundary between two frames f(t) and f(t−1)

FIG. 3 is a graphical illustration of the issue that is being addressed by the edge uncovering area motion vector determining subsystem 230. As shown in FIG. 3, when the image in a frame F(t) has a motion component in the direction of one of the frame boundaries with respect to the previous frame F(t−1), the new frame F(t) may have blocks of video data adjacent the frame boundary that did not occur in the previous frame F(t−1). To determine the motion vector of such blocks, forward estimation can be used to determine the motion vector of the new blocks in the uncovering area. Forward motion estimation does, however, require additional processing time and components which may not be warranted. To address this issue, the edge uncovering area motion vector determination subsystem 230 will determine a reliable motion vector of a block of video data from the previous frame f(t−1) and, in certain circumstances, assign the same motion vector or a corresponding motion vector to the new blocks of video data in the uncovering area adjacent the frame boundary in frame F(t). In this way, the processing requirement to decompress or reformat frame F(t) may be reduced in some circumstances without a significant loss of overall image quality.

Figure 4:
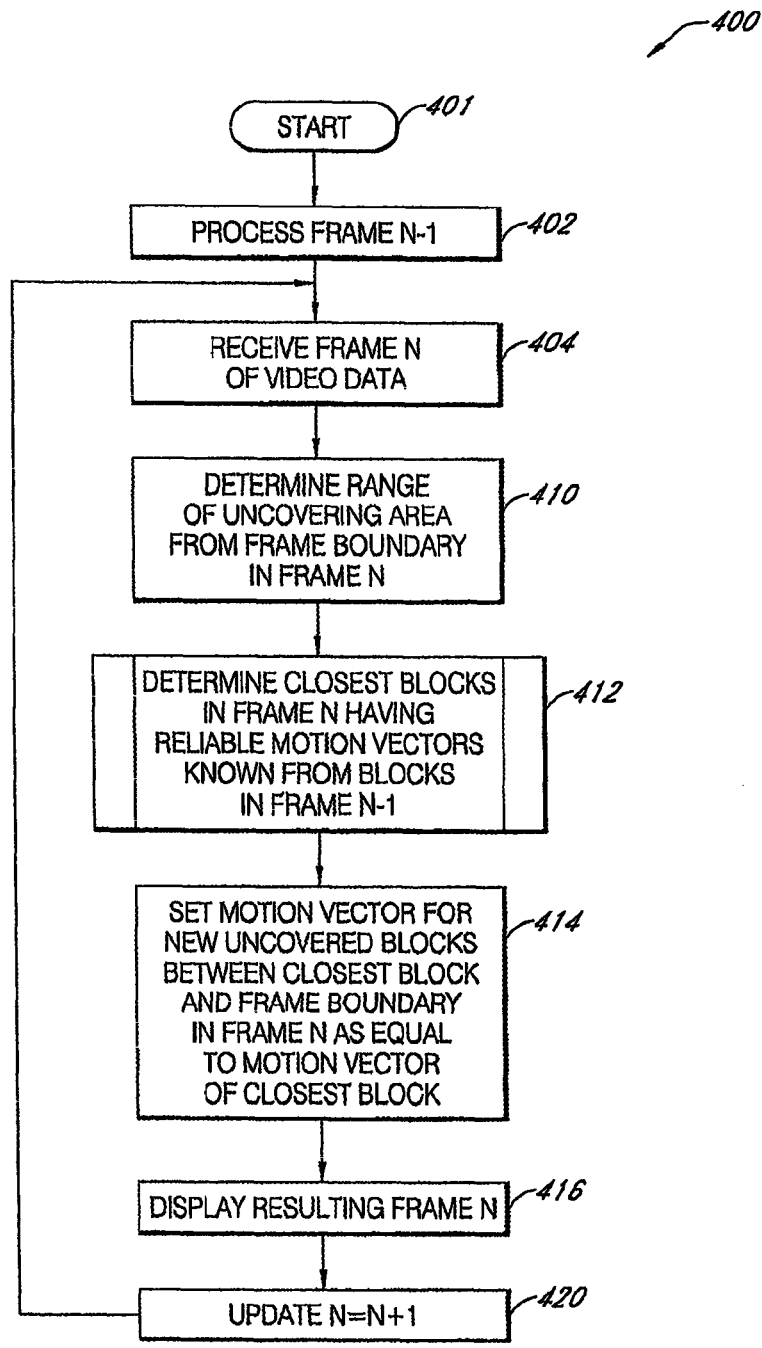
FIG. 4 is an exemplary flow chart illustrating the operation of the video reception system of FIG. 2 as the video reception system ascertains the uncovering area adjacent a frame boundary and determines and assigns a motion vector to the blocks within the uncovering area.

FIG. 4 is an exemplary flow chart which illustrates the process 400 by which the video reception system 200, including the edge uncovering area motion vector determination subsystem 230, determine the motion vectors to be assigned to the blocks of video data in the uncovering area adjacent the frame edge. As shown in FIG. 4, the process 400 from a start state 401 proceeds to process the previous frame N−1 in state 402 in a known manner. The system 200 preferably decodes the decompressed frame N−1 and assigns motion vectors to the blocks of video data in the frame N−1 that are determined to be in motion. The system 200 then proceeds to receive the next frame N of video data in state 404 which has been decoded and decompressed in a known manner. Motion estimation will also be performed on this frame F(t) based on the previous frame N−1. In one implementation, the frame N is decoded and the video blocks are assigned motion vectors in the normal manner. This may result in some video blocks in the uncovering area having unreliable motion vectors as those frames are being assigned motion vectors from blocks in the previous frame N−1 that do not really correspond to the blocks in the uncovering area in frame N.

To address this issue, as will be discussed in greater detail below, the system determines the block closest to the frame boundary in frame N for which a reliable motion vector is known from the previous frame N−1 and then uses this motion vector to correct the unreliable motion vector of blocks of video data in the uncovering area. The system initially determines in state 410 the number of blocks adjacent a frame boundary in which this block may occur.

For example, where there is horizontal motion vector between frames N and N−1, the horizontal search range is $(DX_{min}, DX_{max})$ which allows a determination of the boundary range. More specifically, for the left vertical boundary, the number of blocks in the horizontal direction which might be in the uncovering area and where the boundary between blocks known from frame N−1 and blocks unknown, may be expressed by Formula 1 below:

$$NL = \lfloor |DX_{min}|/BW \rfloor \quad (1)$$

where NL is the range inward from the left vertical frame edge, $DX_{min}$ is the search range which is indicative of the horizontal motion vector range and BW is the blockwidth.

Basically, the search range or horizontal motion vector range—DX is divided by the block width BW and a function, such as a ceiling function, is used to determine maximum integer number of block widths away from the left vertical frame edge in which the closest block having a reliable motion vector known from the previous frame N1 may occur. Similarly, when there is an uncovering area adjacent the right vertical frame edge or boundary, the range in which the block of data closest to the right hand frame boundary in the current frame N that has a reliable motion vector from the previous frame N1 may be found may be expressed by:

$$NR=\lfloor |DX_{max}|/BW \rfloor \quad (2)$$

where NR is the range inward from the right vertical frame edge, $DX_{max}$ is the search range which is indicative of the horizontal motion vector range towards the right vertical frame edge and BW is the block width. A similar process can be used for determining range in which the boundary between known and unknown blocks will occur when there is vertical motion towards the upper or lower horizontal boundary.

Once the determination of the range in which the closest block in frame N to the frame boundary having a reliable motion vector may occur is determined in state 410, the system 200 then determines in function 412 which block in frame N is the actual block. This process will be described in greater detail in connection with the flow chart of FIG. 5, however, it will be appreciated the system 200 will perform processing techniques to verify which blocks in the frame N that is within the range determined in state 410 for which reliable motion vector data known from the previous frame N−1. More specifically, for each line segment, e.g., each row for motion towards a vertical boundary or each column for motion towards a horizontal boundary, the system 230 determines the block of video data in the new frame N for which reliable motion vector data is known from frame N−1.

Once this process is completed for each of the line segments, e.g., each row in a horizontal motion or each column in a vertical motion, the system then sets a motion vector value in state 414 for each of the blocks of video data in the new frame N between the frame boundary and the closest block thereto with a reliable motion vector as being equal to the motion vector data of the block closest to the frame boundary with the reliable motion vector. This, therefore, allows motion vector data to be assigned to the blocks of video data about the periphery of the image in the new frame N as being equal to the previously determined reliable motion vector data from frame N−1.

The system can then further process or display the resulting frame in state 416 in a manner known in the art. Subsequently, the system 200 updates the counter N to N+1 in state 420 and then receive the next frame of video data in state 404. Thus, this process can be repeated for each frame N of the video data being received with the beneficial effect of assignment of more reliable motion vectors without requiring forward motion estimation.

Figure 5A:
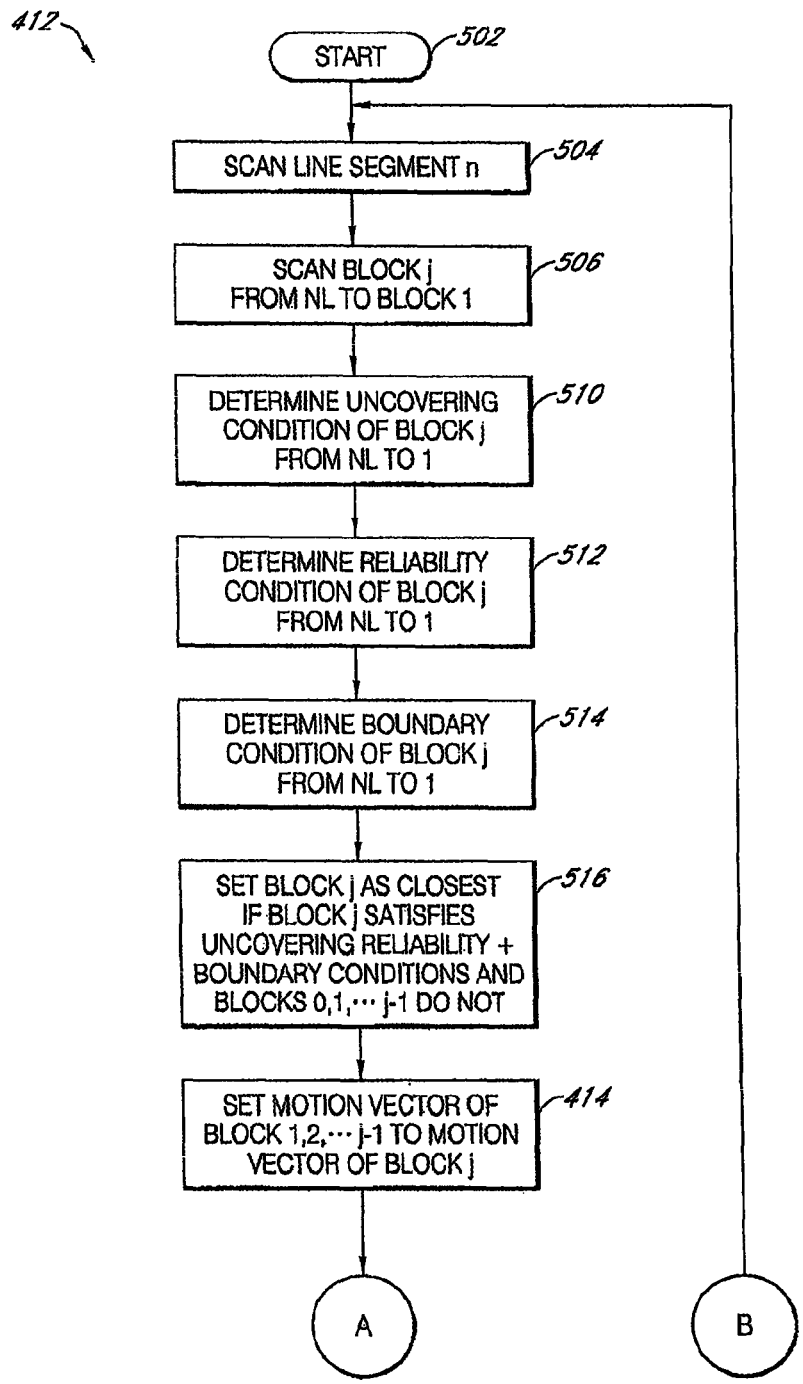
FIGS. 5A and 5B are an exemplary flow chart illustration the operation of the video reception system of FIG. 2 as it determines the boundary block immediately adjacent the uncovering area adjacent a frame boundary.
Figure 5B:
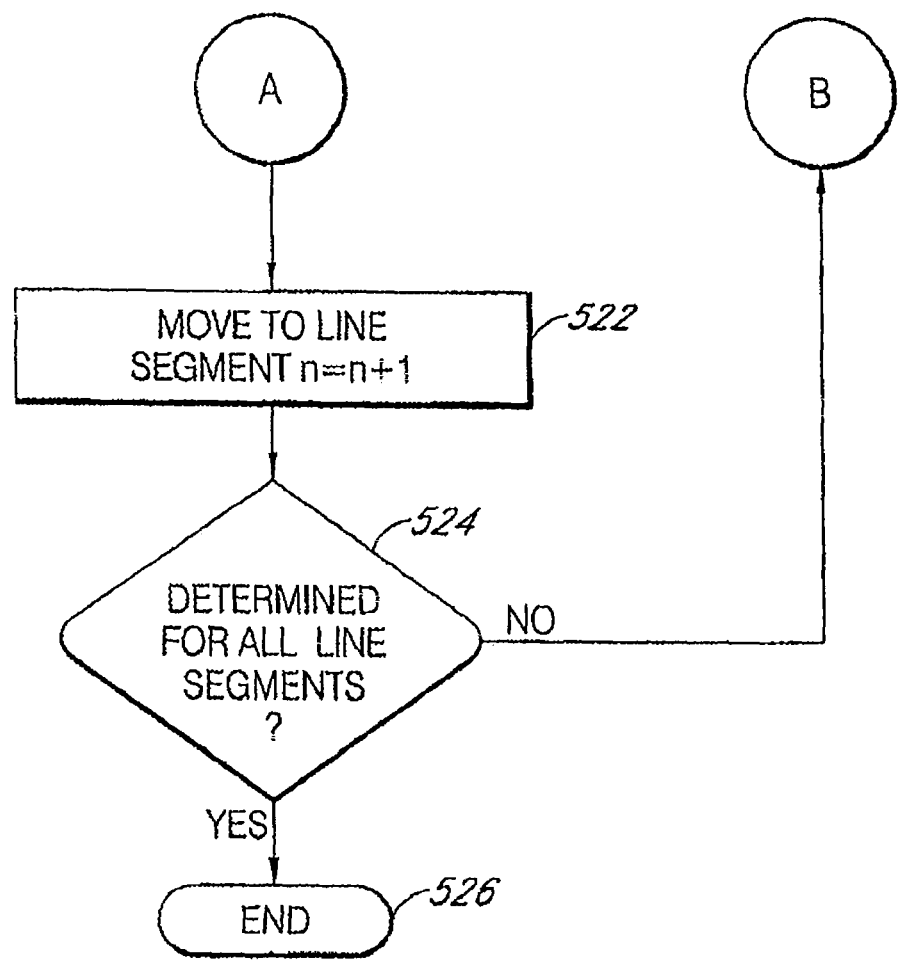

Referring now to FIGS. 5A and 5B, the function 412 by which the block closest to the frame boundary which has a reliable motion vector determined from the previous frame is discussed in greater detail. The discussion associated with FIGS. 5A and 5B refers to an exemplary process associated with the left vertical boundary, however, the function disclosed herein can also be used for the right vertical boundary or the upper or lower horizontal boundaries without departing from the spirit or scope of the present invention.

Figure 6A:
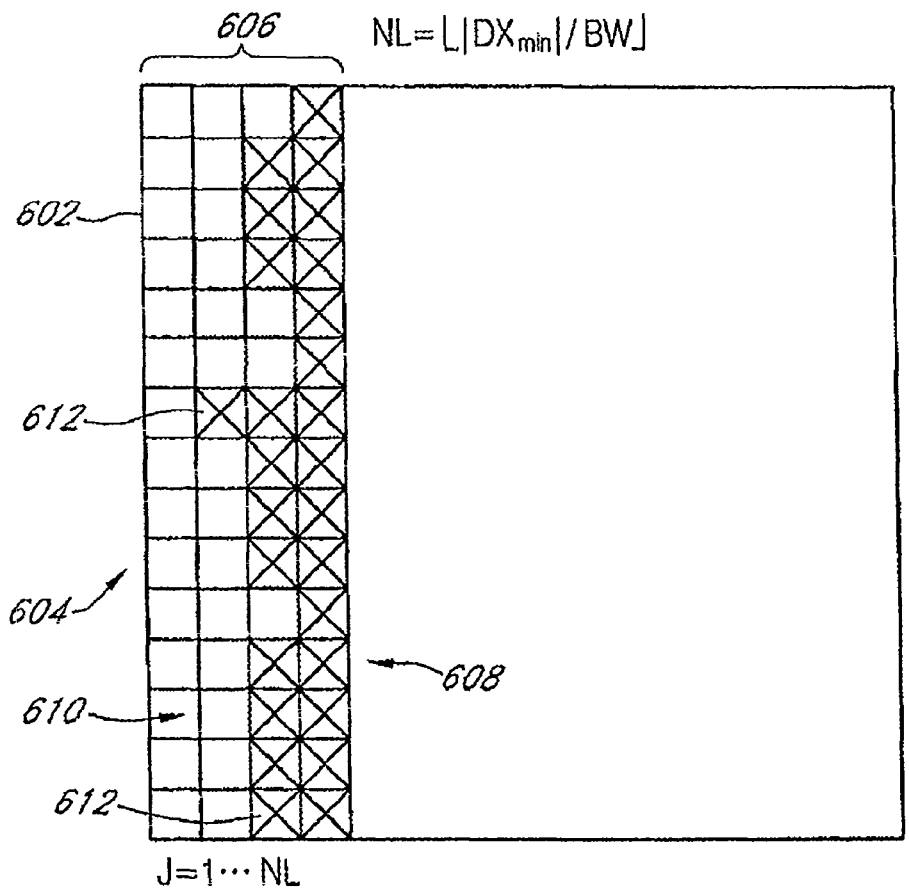
FIGS. 6A and 6B are schematic illustrations illustrating the operation of the video reception system as it determines the boundary blocks adjacent uncovering areas that are adjacent a left vertical boundary of the frame and a right vertical boundary of a frame respectively.

Referring specifically to FIGS. 5A and 5B, from a start state 502, the system 200 scans a line segment n in state 504. In this particular example, which is graphically illustrated in FIG. 6A, the line segment n comprises a row. More specifically, in state 506 the system scans blocks of video data j from the previously determined boundary point NL to the first block located adjacent the left frame boundary 602 (FIG. 6A). The system 200 then determines an uncovering characteristic in state 510 for the blocks of video data along the line segment N from the boundary to the frame edge. In one particular implementation, the system 200 evaluates $$dx(j) < -Tm \quad (3)$$

where dx(j) is the horizontal motion vector of the block j being checked and Tm is a preset threshold. Basically, in state 510, the system 230 is determining if the blocks in the range NL to 1, e.g., the potential uncovering area in the current frame N, are actually blocks of video data that corresponds to blocks of video data in the previous frame N−1 that have moved into the potential uncovering area. Hence, the subsystem 230 is identifying blocks of video data which have a motion vector value in the direction of the left frame boundary 602 (FIG. 6A) that is known from frame N−1.

Similarly, the system 230 is also determining in state 512 a reliability condition for all of the blocks j from NL to 1. More specifically, the system 200 is applying the reliability condition of:

$$s \leq Ts \quad (4)$$

where s is the sum of absolute differences associated with the block j between the corresponding blocks in frame N and N−1 and Ts is a threshold value. The reliability condition is performing a mathematical operation to determine whether the potential boundary block in frame N corresponds to the block of the previous frame N−1 and thus has a reliable motion vector. Consequently, the sum of the absolute difference between the block in frame N and frame N−1 is calculated and is determined whether it is less than a preselected threshold $T_s$ indicating that there is a higher reliability that the block is the same in both frames and that the motion vector is thus reliable.

Subsequently, the system 200 determines in state 514 a boundary condition for each of the blocks j from NL to 1 according to the formula $$j*BW+dx(j)<Td \quad (5)$$

where j defines the block number, BW defines the block width, dx(j) defines the motion vector value of block j and Td is a threshold value. In this condition, the system 200 is determining whether the block having a reliable motion vector is within a threshold of the frame boundary such that setting the motion vector of the blocks interposed between the this block that the frame boundary to the motion vector of this block will not have a significant impact on image quality of the resulting image.

Referring more specifically to FIG. 6A, in function 412, the system 200 is determining which of the blocks 604 in the potential uncovering area 606 are the blocks that satisfy each of the uncovering, reliability and boundary condition determined in states 510, 512 and 514. In the illustration of FIG. 6A, the blocks that satisfy each of these three conditions are the blocks 608 marked with an X. The other blocks 610 are the blocks that are interposed between the blocks satisfying the condition and the left edge of the frame 602. It is the blocks 610 for which the motion vector in the direction of the frame boundary 604 is not known. In state 516, the system 200 sets the closest block 612 along each line segment, e.g., along each row in the illustration of FIG. 6A, closest to the frame edge 604 as the closest block to the frame boundary that has a reliable motion vector from the previous frame for that particular line segment.

Subsequently, the system 200 then sets, in state 414, the motion vector of the blocks 610 interposed between the blocks 612 and the edge of the frame 602 as being equal to the motion vector of the block 612 as discussed above in conjunction with FIG. 4. As shown in FIG. 5B, this process is repeated for each line segment until it is determined in decision block 524 that all line segments have been similarly processed.

Figure 6B:
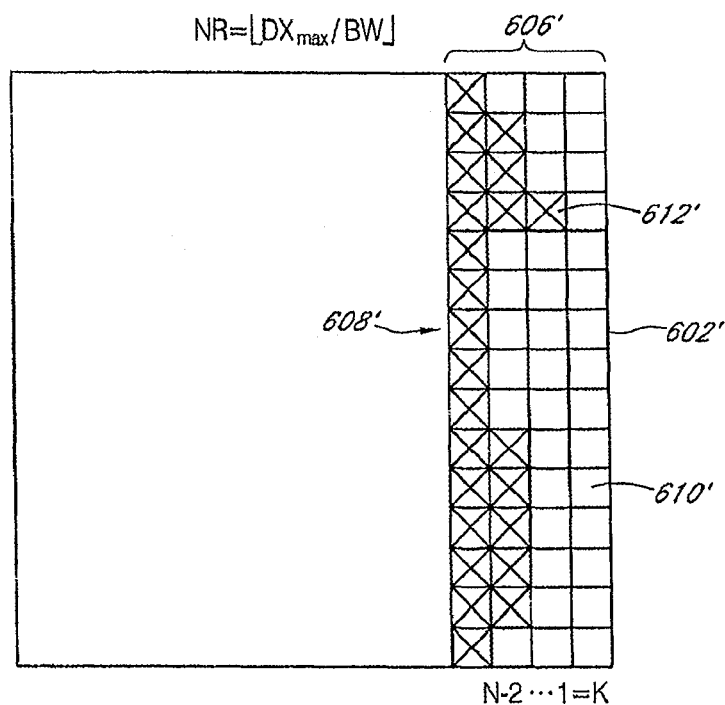

It will be appreciated that while FIGS. 5A and 5B have disclosed this particular process in connection with motion towards the left vertical boundary, a similar process can be performed with horizontal motion of the frame image towards the right vertical boundary in the manner that is illustrated in FIG. 6B. More specifically, a range of uncovering area on the right vertical boundary is determined by dividing the $DX_{max}$ in the positive direction, e.g., towards the right vertical boundary 601' of the frame, divided by the block width. Within the range, for each line segment, e.g., for each row, the system 200 looks for blocks that have motion vector in the positive X direction among each of the blocks k from N−2 to 1.

Specifically, the system 200 applies corresponding conditions to Formulas 3, 4 and 5 reproduced above in order to identify the boundary blocks 612' in frame N that have motion vectors moving in the direction of the frame edge 602' that are reliability identified from the previous frame N−1. Exemplary formulas for the uncovering condition, the reliability condition, and the boundary condition for the right horizontal frame boundary are reproduced below as Formulas 6, 7 and 8:

$$dx(k) > Tm \quad (6)$$

$$s <= Ts \quad (7)$$

$$W - (k*BW + dx(k)) < Td \quad (8)$$

It will be appreciated that the Formulas 6, 7 and 8 correspond to the Formulas 3, 4 and 5 except that they have been adjusted to account for motion in the direction of the right vertical boundary 602'.

It will be further appreciated that the same type of analysis can be performed on a column by column basis for the upper horizontal boundary and the lower horizontal boundary and that once a block of video data in each line segment of the current frame N has been reliably identified as a block of video data from a previous frame N−1 that the motion vector data for that particular block can be substituted for the unknown block interposed between the boundary block and the frame boundary.

As a result of performing this analysis, the blocks adjacent the edge of the frame can be assigned a motion vector that likely will correspond better to the motion vector of the particular block. This allows the current frame N to be displayed with better image quality without requiring the expense of forward motion estimation. This further results in a savings of processing time and potentially a reduction in the amount of hardware needed to implement this particular design.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of processing video data comprising:
receiving a first video frame with first blocks of pixels associated with a known motion vector and a second video frame with second blocks of pixels and having motion in a direction of a first frame boundary, the second blocks corresponding to the first blocks, and uncovered blocks adjacent to the first frame boundary not corresponding to the first blocks in the first video frame;
determining a first block for each line segment in the second video frame corresponding to a block in the first video frame, wherein the first block is in the second frame located proximate to the first frame boundary satisfying a boundary condition threshold based on the first frame boundary and has the known motion vector from the first video frame; and assigning a motion vector for at least one of the line segments in the second video frame to the uncovered blocks in the line segment of the second video frame interposed between first block in the second video frame and the first frame boundary in response to each of the interposed blocks satisfying said boundary condition threshold.

2. The method of claim 1, wherein the at least one of the line segments includes a row and the first frame boundary including either left or right vertical boundaries of the second video frame.

3. The method of claim 1, wherein determining the first block includes assessing whether the first block has the motion vector in the direction of the first frame boundary.

4. The method of claim 3, wherein determining the first block includes determining whether the first block in the second video frame corresponds to a known block in the first video frame.

5. The method of claim 4, wherein determining whether the first block corresponds to the known block includes performing a Sum of Absolute Difference (SAD) analysis between the first block and the known block in the first video frame.

6. The method of claim 3, further comprising calculating a range of blocks of video data based at least in part on a motion field of the blocks towards the first frame boundary between the first video frame and the second video frame.

7. The method of claim 6, wherein determining the first block includes evaluating the blocks within the range.

8. The method of claim 1, wherein assigning the motion vector for at least one of the line segments in the second frame to the uncovered blocks includes assigning the motion vector of the first block to the uncovered blocks between the first block and the first frame boundary.

9. A method of processing a sequence of video frames comprising:
receiving a video frame N−1 having first blocks of video data with motion vectors assigned thereto;
receiving a video frame N having second blocks of the video data; determining whether the video frame N has motion in a direction of a first frame boundary where the second blocks correspond to the first blocks and uncovered blocks adjacent to the first frame boundary in the video frame N not corresponding to the first blocks in the video frame N−1;
determining a first block for one or more line segments n of the video frame N corresponding both to a block in the video frame N−1 and positioned proximate to the first frame boundary satisfying a boundary condition threshold based on the first frame boundary with a known motion vector is known in the video frame N−1, for the video frames N having motion in the direction of the first frame boundary and the second blocks in the video frame N corresponding to the first blocks in the video frame N−1 and the uncovered blocks adjacent to the first frame boundary in the video frame N not corresponding to the first blocks in the video frame N−1;

determining a motion vector for one or more of the line segments n in the video frame N for one or more blocks of video data j interposed between the first block in the frame N and the first frame boundary in response to each of the interposed blocks satisfying said boundary condition threshold;

formatting an image of the video frame N for subsequent display thereof; and incrementing N and repeating the steps above for subsequent frames in a sequence of video frames.

10. The method of claim 9, wherein the at least one line segment n includes a row and the first frame boundary including either left or right vertical boundaries of the video frame N when the motion is in a horizontal direction.

11. The method of claim 10, wherein determining the first block includes determining the first block based upon evaluating the blocks within the range.

12. The method of claim 11, wherein determining the first block for line segment n in the video frame N includes determining a block j on a line segment n including determining whether:

the block j in frame N corresponds to the block in the previous video frame N−1; and the block j has the motion vector in the direction of the first frame boundary exceeding a pre-selected threshold.

13. The method of claim 12, wherein determining whether the block j in the video frame N corresponds to the block in the video frame N−1 includes performing an SAD analysis.

14. The method of claim 12, wherein determining the first block includes setting the first block as the block j closest to the first frame boundary for which the block j in the video frame N corresponds to the block in the previous video frame N−1 and the block j has the motion vector in the direction of the first frame boundary exceeding the pre-selected threshold.

15. The method of claim 14, wherein determining the first block includes setting the first block as the block j satisfying a condition of the first block determined to be within the pre-selected threshold distance of the first frame boundary.

16. The method of claim 15, further comprising determining whether the first block is within the pre-selected threshold distance of the first frame boundary based at least in part on a magnitude of the motion vector of the block j in the direction of the first frame boundary.

17. The method of claim 9, further comprising calculating a range of blocks of video data wherein the first block is likely to be located at least in part based on a motion field toward the first frame boundary between the video frame N and the video frame N−1.

18. The method of claim 9, wherein assigning the motion vector includes assigning the motion vector of the first block as the motion vector for blocks of video data interposed between the boundary block and the first frame boundary.

19. A system for processing video data comprising:

a receiver for receiving a first frame and a second frame of sequential video data, the first frame including first blocks of pixels with a known motion vector associated therewith and the second frame having relative motion with respect to the first frame with second blocks in the second frame corresponding to the first blocks in the first frame, and uncovered blocks adjacent to a first frame boundary not corresponding to the first blocks; and a motion estimation system for determining a first block of each line segment of the second frame corresponding to a block in the first frame having the known motion vector, for determining when the first block of each line segment of the second frame corresponding to a block in the first frame is within a threshold distance of the first frame boundary, and for assigning a motion vector to the remaining blocks interposed between the first block and the first frame boundary having unknown motion vectors in response to each of the interposed blocks satisfying the boundary threshold distance.

20. The system of claim 19, wherein the at least one of the line segments includes a row and the first frame boundary includes either left or right vertical boundaries of the frame.

21. The system of claim 19, wherein the motion estimation system is for determining the first block for at least one of the line segments by assessing whether the first block has the known motion vector in a direction of the first frame boundary known from the first frame.

22. The system of claim 21, wherein the motion estimation system is for determining the first block for each line segment by comparing the first block in the second frame with a known block in the first frame to determine whether the first block in the second frame corresponds to the block in the first frame.

23. The system of claim 22, wherein comparing includes performing a Sum of Absolute Difference (SAD) analysis between the first block and the block in the first frame.

24. The system of claim 21, wherein a range of blocks of video data is calculated, based at least in part on a motion field towards the first frame boundary between the first frame and second frame.

25. The system of claim 24, wherein the motion estimation system is for determining the first block based upon evaluating blocks within the range.

26. The system of claim 19, wherein assigning the motion vector based on the motion vector of the first block to the uncovered blocks between the first block and the first frame boundary in the at least one of the line segments includes assigning the motion vector of the first block to the uncovered blocks between the first block and the first frame boundary.

* * * * *